April 13, 1937.   P. L. BYERS   2,076,702
SEEDING MACHINE
Filed Aug. 5, 1936
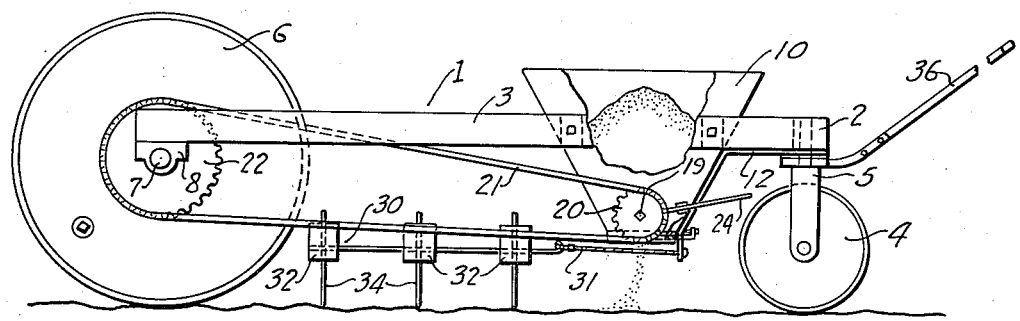
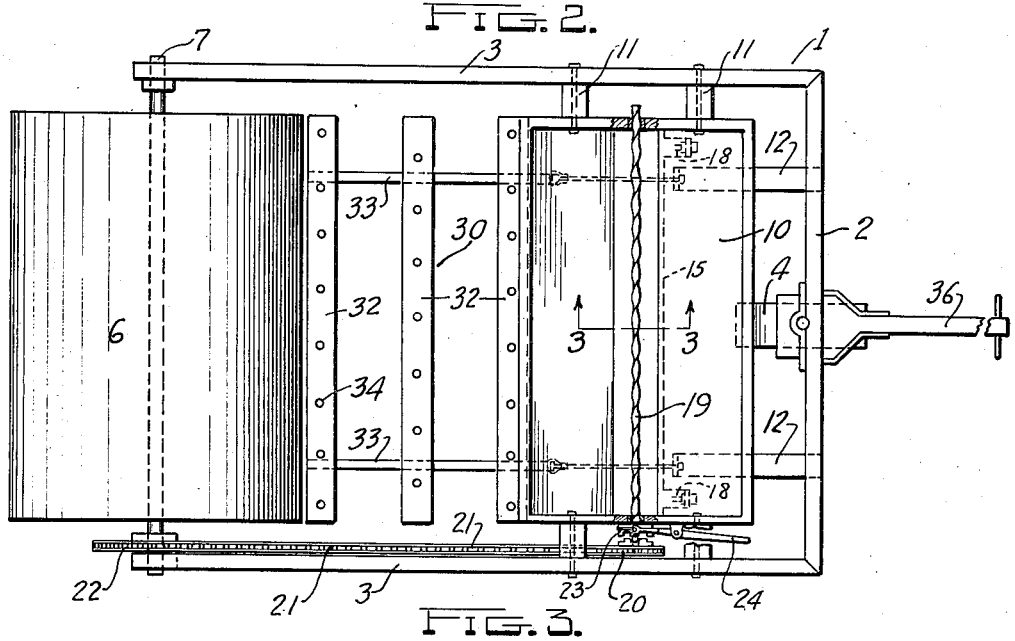
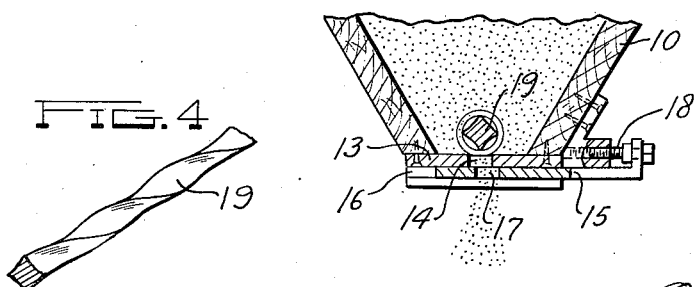
Inventor
Phillip L. Byers
By Owen & Owen,
Attorneys.

Patented Apr. 13, 1937

2,076,702

UNITED STATES PATENT OFFICE 2,076,702

SEEDING MACHINE

Phillip L. Byers, Clyde, Ohio, assignor to Harry S. Day, Fremont, Ohio

Application August 5, 1936, Serial No. 94,319

2 Claims. (Cl. 111—13)

This invention relates to seeding machines, and particularly to those adapted for the planting of grass seed.

The object of my invention is the provision of a simple, efficient and improved machine which in operation will simulate as nearly as possible the hand planting of grass seed, wherein the seed is first distributed over the surface to be planted, and is then raked into the soil and rolled.

Further objects and advantages of the invention reside in various specific features of construction of the machine, which will be apparent from the following detailed description thereof and from the accompanying drawing, illustrating the invention, in which—

Fig. 1 is a side elevation of a seeding machine embodying the invention, with parts broken away; Fig. 2 is a top plan view thereof, with parts broken away; Fig. 3 is an enlarged detailed section on the line 3—3 in Fig. 2, and Fig. 4 is a perspective view of a portion of the worm member of the seeding unit.

Referring to the drawing, 1 designates a frame, in the present instance of U-form, with its cross member 2 forming the front end of the frame and with the legs 3, 3 forming the side members of the frame. The front end of the frame is supported by a caster wheel 4, the fork 5 of which has its head journaled in a suitable bearing provided centrally on the front end member 2 of the frame, as shown in Fig. 2. The rear end of the frame is supported by a roller 6 which is preferably of the water drum type and adapted to contain a sufficient quantity of water to give the roller the desired weight for soil rolling purposes. A shaft 7 extends axially through the roller 6 and has its ends journaled in suitable bearings 8 attached to the rear end portions of the frame sides 3.

The seed hopper 10, which is V-form in cross section, is disposed endwise between the front end portions of the frame sides 3 and is supported at its ends by brackets 11 attached to the frame sides and at its front side by bracket members 12 extending rearwardly from the front cross member 2 of the frame and down the front tapered side of the hopper. The bottom of the hopper is of truncated form and closed by a bottom plate 13 (Fig. 3), except for a feed slot 14 disposed centrally of the front and rear bottom edges of the hopper and extending throughout the length of the hopper bottom. The width of the slot is controlled by an adjustable valve plate 15 which is mounted in sliding contact with the under side of the plate 13 and is mounted at its ends in guides 16 at the opposite ends of the bottom plate. The valve plate 15 has a slot 17 in register with and substantially corresponding in width and length to the speed slot 14 and adjustable by a movement of the valve plate transverse to the feed slot 14 to regulate the effective feeding width of the slot. The adjustment of the valve plate 15 is effected by screws 18, which are rotatably attached to the plate and thread into socketed members carried by the hopper.

A positive feeding of seed through the hopper slot is effected by the turning of a worm shaft 19 which is disposed within the bottom of the hopper over the slot 14 and has its ends suitably journaled in bearing bushings provided in the ends of the hopper. The shaft is so disposed and is of such size with respect to the feed slot as to prevent a feeding of seed through such slot except when the shaft is rotated and during such rotation an even feeding of the seed throughout the length of the slot is effected. The shaft 19 at one end is provided with a sprocket wheel 20, which is connected by a chain 21 to a sprocket wheel 22 fixedly mounted on the corresponding end of the roller shaft 7. It is thus apparent that the feed shaft 19 is driven from the roller 6. In order to enable the feed shaft to be disconnected from the driving means, the sprocket 20 may be loose on the feed shaft and connected thereto by a clutch member 23, which is shiftable into and out of clutch engagement with the sprocket wheel by the operation of a shipper-lever 24 attached to the adjacent end of the feed hopper.

It is found in practice that a very inexpensive and efficient worm shaft 19 is provided by merely utilizing for such purpose twisted metal rods of the type customarily employed for concrete reinforcement and which rods before twisting are of square or other polygonal form in cross-section. This provides a feed wheel with shallow worm grooves which is particularly efficient for the regulated feeding of seeds such as fine grass seed.

A rake 30 is disposed between the following roll 6 and hopper 10 and is attached to bottom extensions of the hopper supporting brackets 12 by flexible cable members 31. The rake 30, in the present instance, comprises three cross bars 32 rigidly spaced apart by tie members 33 to the forward ends of which the cables 31 are attached, and each of said cross bars having a plurality of teeth 34 projecting downward therefrom with each set in equidistantly spaced relation and staggered with respect to the teeth of the next set in order. It is apparent that the effective lengths of the hopper, rake and roller are substantially the same so that the seed distributed onto the subjacent soil from the discharge slot of the hopper is efficiently raked and the soil then rolled when the machine is in seeding operation. The machine may be propelled in any suitable manner, and in the present instance is shown as having a handle 36 projecting forwardly from its fork head 5 to permit manual pulling of the machine.

It is found in practice that when the machine is in operation and the valve plate 15 has been properly adjusted to regulate the size of the hopper feed slot, to suit the nature of the seed and the thickness with which it is to be planted, the shaft 19 will effect a regulated feeding of the seed in a substantially continuous stream crosswise of the machine and throughout the length of the feed slot, and the teeth of the rake 30 will effectively rake in the seed and the following roll 6 will press the soil firmly down in covering relation to the seed, thus accomplishing seeding, raking and rolling in a more uniform and efficient manner than it could probably be done by hand. While the machine has been specifically described as a grass seeding machine, it may also be used for the distributing of other forms of seeds or of a fertilizing material to and raking and rolling it in the soil.

I wish it understood that my invention is not limited to any specific construction, arrangement or form of the parts, as it is capable of numerous modifications and changes without departing from the spirit of the claims.

Having thus described my invention, what I claim as new, and desire to secure by United States Letters Patent, is:

1. In a seeding machine, a substantially horizontal U-shaped frame, a hopper disposed between the sides of the frame at the front thereof, means to connect the hopper to the sides of the frame with the bottom of the hopper projecting below the frame, brackets connected to the front of the frame and having depending portions which are secured to the front side of the hopper for supporting the latter, a raking device rearwardly of the hopper composed of spaced cross members having depending teeth, tie members connecting the cross members, flexible members connected to the raking device and to the depending portions of the brackets whereby the raking device may move transversely of the frame, a following roll journaled at the rear end of the frame, seeding feeding means within the hopper and means to actuate the said feeding means by the roll.

2. In a seeding machine, a substantially horizontal frame having sides, a hopper disposed between the sides of the frame at the front thereof, means to connect the hopper to the sides of the frame with the bottom of the hopper projecting below the frame, brackets connected to the front of the frame and having depending portions which are secured to the front side of the hopper for supporting the latter, a raking device rearwardly of the hopper, flexible members connecting the raking device to the lower ends of the brackets, a following roll journaled in the rear end of the frame, seeding means in the hopper, and means to actuate the seeding means by the following roll.

PHILLIP L. BYERS.